ically as specified.

UNITED STATES PATENT OFFICE.

JAMES O. DRAPER, OF PAWTUCKET, RHODE ISLAND.

IMPROVEMENT IN COMPOSITIONS OR SOAPS FOR CLEANSING THE TEETH.

Specification forming part of Letters Patent No. 115,719, dated June 6, 1871.

*To all whom it may concern:*

Be it known that I, JAMES O. DRAPER, of Pawtucket, in the county of Providence and State of Rhode Island, have invented a new and useful Improvement in Tooth-Soap; and I do hereby declare that the following is a full, clear, and exact description thereof, which will enable others skilled in the art to make and use the same.

This invention relates to a new and useful improvement in a soap for cleansing the teeth; and it consists in a soap manufactured as hereinafter described.

In carrying out my invention I take any given quantity of purified beef-tallow or other purified fat and boil it in weak lye, made of soda-ash and lime, until saponification takes place. The lye is then separated from the soap and drawn off. New weak lye is now added, and the soap is boiled down until it becomes firm. The lye is allowed to settle while the soap is getting cold. The soap is now kneaded and worked as dough is kneaded. Tincture of gum myrrh, refined and pulverized borax, and pulverized orris-root are now added, with any perfume which may be desired or pleasant to the taste. The soap is thus made mild or neutral, pleasant in the mouth, and unsurpassed as a cleansing medium for the teeth, and a strengthener of the gums.

Having thus described my invention, I claim as new and desire to secure by Letters Patent—

The above-described tooth-soap, substantially as specified.

JAMES O. DRAPER.

Witnesses:
E. F. CRAWFORD,
JOSEPH E. HOOD.